United States Patent [19]

Langenstein

[11] 4,392,661

[45] Jul. 12, 1983

[54] SUPPLY APPARATUS TO PROVIDE ELECTRICITY TO MOTOR-DRIVEN APPLIANCES, ESPECIALLY LAWN EDGE TRIMMERS, DRIVEN WITH ELECTRIC MOTORS

[76] Inventor: Max Langenstein, Mühlweg 1, 7928 Illertissen, Fed. Rep. of Germany

[21] Appl. No.: 188,732

[22] Filed: Sep. 19, 1980

[30] Foreign Application Priority Data

Sep. 22, 1979 [DE] Fed. Rep. of Germany ... 7926920[U]

[51] Int. Cl.³ .................... B62B 15/00; H01M 2/10
[52] U.S. Cl. .................... 280/12 M; 191/12.2 R; 224/902; 242/85.1; 294/137; 429/100
[58] Field of Search ............ 280/12 M, 12 L, 12 R, 280/18, 19, 12 S, 12 W; 429/100, 96, 97, 99, 98, 176, 163; 224/902; 307/150; 242/85.1; 191/12.2 R, 12.4; 339/103 B, 119 C; 294/137, 172

[56] References Cited

U.S. PATENT DOCUMENTS

| 2,195,553 | 4/1940 | Bartlett | 280/18 |
| 2,375,373 | 5/1945 | Leathers | 339/103 B |
| 2,918,228 | 12/1959 | Waller | 242/85.1 |
| 2,933,548 | 4/1960 | Walker | 429/100 |
| 3,660,169 | 5/1972 | Clune et al. | 429/163 X |
| 3,963,972 | 6/1976 | Todd | 429/97 X |
| 4,095,871 | 6/1978 | Holte | 242/85.1 X |

*Primary Examiner*—David M. Mitchell
*Assistant Examiner*—Milton L. Smith
*Attorney, Agent, or Firm*—Karl F. Ross; Herbert Dubno

[57] ABSTRACT

An electrical supply apparatus particularly for hand-tools, in the form of a housing having a handle at its upper end and a bottom constituting a skid, the housing having a vertical, longitudinal median plane along which the skid bottom is elongated. An electrical cable can be wound in a recess above this bottom and emerges from an opening below the center of gravity of the apparatus by being connected to the housing by a stress relief. The curvature of the skid is greater in the longitudinal direction than in its transverse direction.

4 Claims, 7 Drawing Figures

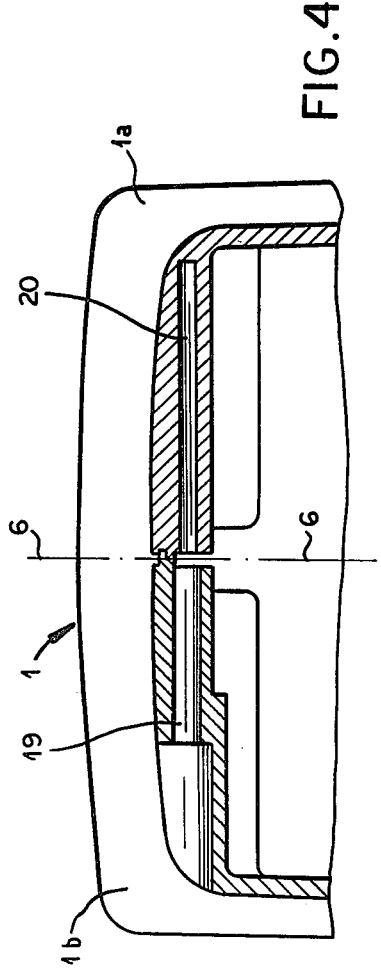
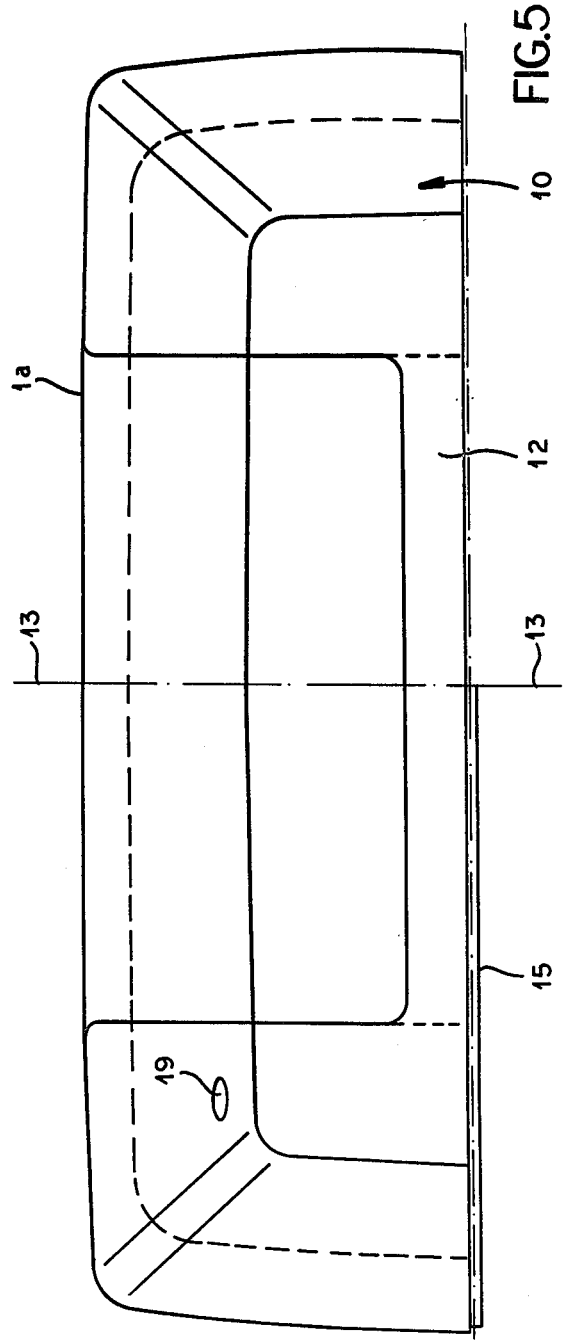

SUPPLY APPARATUS TO PROVIDE ELECTRICITY TO MOTOR-DRIVEN APPLIANCES, ESPECIALLY LAWN EDGE TRIMMERS, DRIVEN WITH ELECTRIC MOTORS

FIELD OF THE INVENTION

The invention relates to a supply apparatus for providing electricity to appliances, especially lawn edge trimmers, driven with an electrical motor and comprising a housing having disposed inside a rechargeable electrical energy source and a connection cable for the electrically driven device.

BACKGROUND OF THE INVENTION

It is known to operate hand tools or work devices driven by electric motors independently from an electrical supply network and to furnish the hand tools and work devices with batteries and especially with rechargeable batteries. However, the power and the operating lives of such battery operated tools and devices, are comparatively small, since the batteries interfere with the capability of handling of the tool or the device are too large, or are too heavy. Usually, such hand tools or work devices have low power drives and require frequent recharging of the batteries.

On the other hand supply apparatus comprising rechargeable electrical energy sources are known for boats to power the electrical board system. Such electrical supply apparatus are connected to the board grid by plugs and sockets. These known supply apparatus are less suitable for electrically operated hand tools or work devices, since the plug connection can easily unplug upon movement of the hand tool or the work device. In addition, the supply apparatus has to be picked up again and again corresponding to the advance in the work and has to be carried after the hand tool and work device, respectively.

OBJECT OF THE INVENTION

It is the object the invention to provide an electrical supply apparatus such that even with a larger energy demand an uniterrupted working with the hand tool or the work device is possible; moreover the electrical connection between the hand tool and the work device, on the one hand, and the supply apparatus, on the other hand, is maintained even under traction at the connecting cable; finally freedom of motion of the hand tool or the work device is not hampered by the supply apparatus.

SUMMARY OF THE INVENTION

This problem is solved in accordance with the present invention by having the casing bottom formed as a slide runner or skid. For this purpose the bottom surface in a direction longitudinal to the runner is strongly curved convex and provided with a rocker form and curved less strongly convex in the transverse direction. The connecting cable passes out of the casing near the vertical middle plane parallel to the longitudinal runner of the housing and slightly above the rocker form of the runner, the cable being attached to the housing with traction relief. In a preferred embodiment of the invention the center of gravity of the supply apparatus is disposed as low as possible in the direction of the bottom surface of the housing and the exiting position of the connecting cable in the housing wall is not substantially higher than the center of gravity.

The unit can be pulled along on the cable by attaching the connecting cable to the housing of the unit and by providing traction relief for the connecting cable without the risk of a separation of the cable from the supply apparatus. The cable pull acts substantially in the longitudinal direction of the runner such that the unit can follow the cable pull without problem and can pass over ground roughness by sliding on its bottom surface. The low position of the center of gravity of the apparatus assures the stability of the supply apparatus on its bottom surface. A turning upside down of the apparatus under the action of the cable traction is incidentally practically prevented by disposing the exit point of the connecting cable not substantially higher than the center of gravity of the apparatus and in particular also by the curvature of the bottom surface of the apparatus in cross direction to the longitudinal direction of the runner. This curvature provides the possibility that the apparatus can rotate around its vertical axis without problem on the housing bottom, that is the apparatus can be redirected into the pull direction of the cable.

In order to receive the cable an annular recess runs around the housing wall and is open to the outside for the windings of the connecting cable wound around the housing. The exit point of the connecting cable is advantageously disposed in this recess at its edge neighboring to the bottom surface. The connecting cable can then be rolled up around the apparatus housing, for example by rotating the supply apparatus around the vertical center axis, such that the apparatus housing serves at the same time for the purpose of a cable drum. In addition the connecting cable wound around, the apparatus housing protects the supply apparatus upon transportation and the like against impact stress resulting in certain circumstances in a damage of the apparatus.

The housing can comprise two identically congruent housing shells made for example from tough and impact resistant plastic, which are mated in a vertical center plane parallel to the longitudinal direction of the runner and which comprise in each case half of the bottom face, the recess space and the handle disposed above the recess. It is advantageous to provide the two housing shells symmetrically to the vertical center plane of the housing in the transverse direction and to connect them by tongue and groove at their smaller edges.

BRIEF DESCRIPTION OF THE INVENTION

In the Drawing:

FIG. 4 is a partial sectional view in the direction IV—IV of FIG. 3;

FIG. 5 is a plan view of the housing shell according to FIG. 2;

SPECIFIC DESCRIPTION

Figure 1:
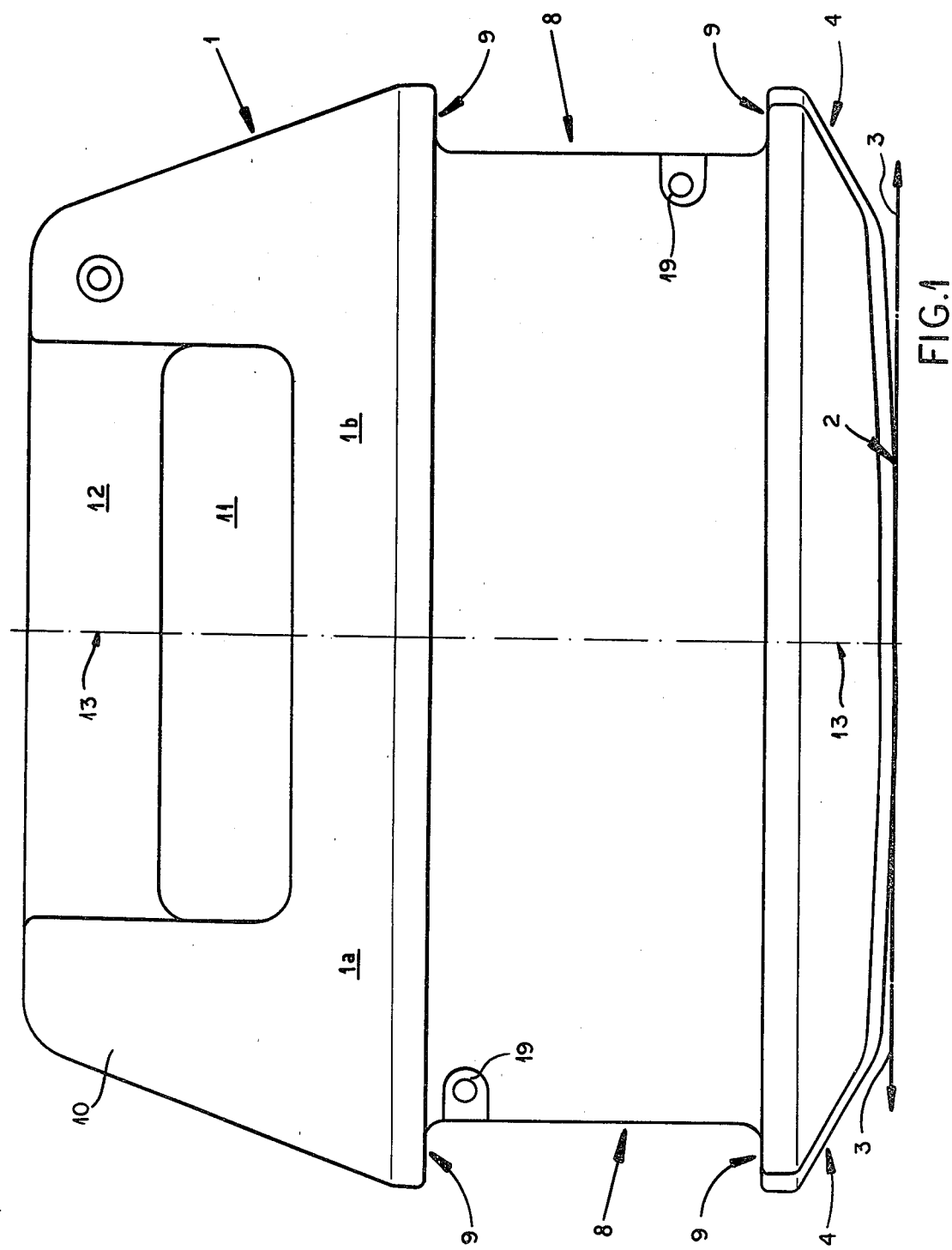
FIG. 1 is a side elevational view of the supply apparatus in accordance with the invention, however without connecting cable.

The supply apparatus shown in the drawing comprises a housing generally designated as 1, which contains the energy sources, in particular rechargeable electrical batteries and accumulators, which are not depicted in the drawing. Also not shown is a connecting cable for connecting the supply apparatus with the hand tool or work device to be supplied by the apparatus.

The housing bottom of the supply apparatus is formed as a sliding runner. For this purpose the bottom face 2 is convexly curved strongly in the longitudinal direction of the runner indicated in the drawing by the arrows 3—3 at least at one end, and, in the embodiment shown at two ends, forming a runner bulge 4 like a rocker bottom. The latter is curved more weakly along the length of the runner in the cross direction 5—5 perpendicular to the above direction. Therefore, the apparatus cannot only move on its bottom face 2 in the longitudinal direction 3 of the runners by slipping and sliding, but because of the curvature of the bottom face 2 perpendicular to the longitudinal direction of the runners it can also rotate around the vertical housing center axis in a simple way. In the vertical center plane 6—6, parallel to the longitudinal direction 3—3 of the runner, of the housing 1, which is in FIG. 2 the plane of the sheet of the drawing, the connecting cable, which is not shown, exits near the bulge 4 of the runner out of the housing 1 through a cable opening 7. The cable is also attached to the housing with traction relief, which again is in principle known and is not shown for simplicity. In any case, this traction relief effects that upon traction on the cable from outside of the housing 1 the traction on the cable is transferred directly to the housing upon the entering of the cable into the housing 1, that is the housing 1 can follow the traction of the cable by sliding and rotating on the bottom face 2, whereas the cable inside the housing remains traction free, and therefor its connection to the energy sources cannot be affected by the traction and pull on the cable. The center of gravity of the apparatus in the direction to the bottom face 2 of the housing 1 is as low as possible. At the same time, the exit opening 7 of the connecting cable is disposed in the housing wall at a position lower or at least not substantially higher than the center of gravity. The apparatus therefore has very good stability against turning upside down.

A recess 8 open to the outside and running around the housing wall is disposed above the bulged bottom face 2. The recess 8 is formed by a shoulders 9 of the housing wall. In case the supply apparatus is not used, then the connecting cable solidly attached to the apparatus housing 1 can be wound around the apparatus housing 1 and the windings of the cable are inserted into the recess 8. The apparatus housing 1 then fulfills at the same time the function of a cable drum. As is shown in particular in FIGS. 2 and 3 the exit opening 7 of the connecting cable is disposed deep-situated in the housing wall in the recess 8 at its edge neighboring to the bottom face 2. Above the recess 8 the housing 1 is formed to a handle part 10 with a gripper opening 11 and a gripper frame 12.

Figure 2:
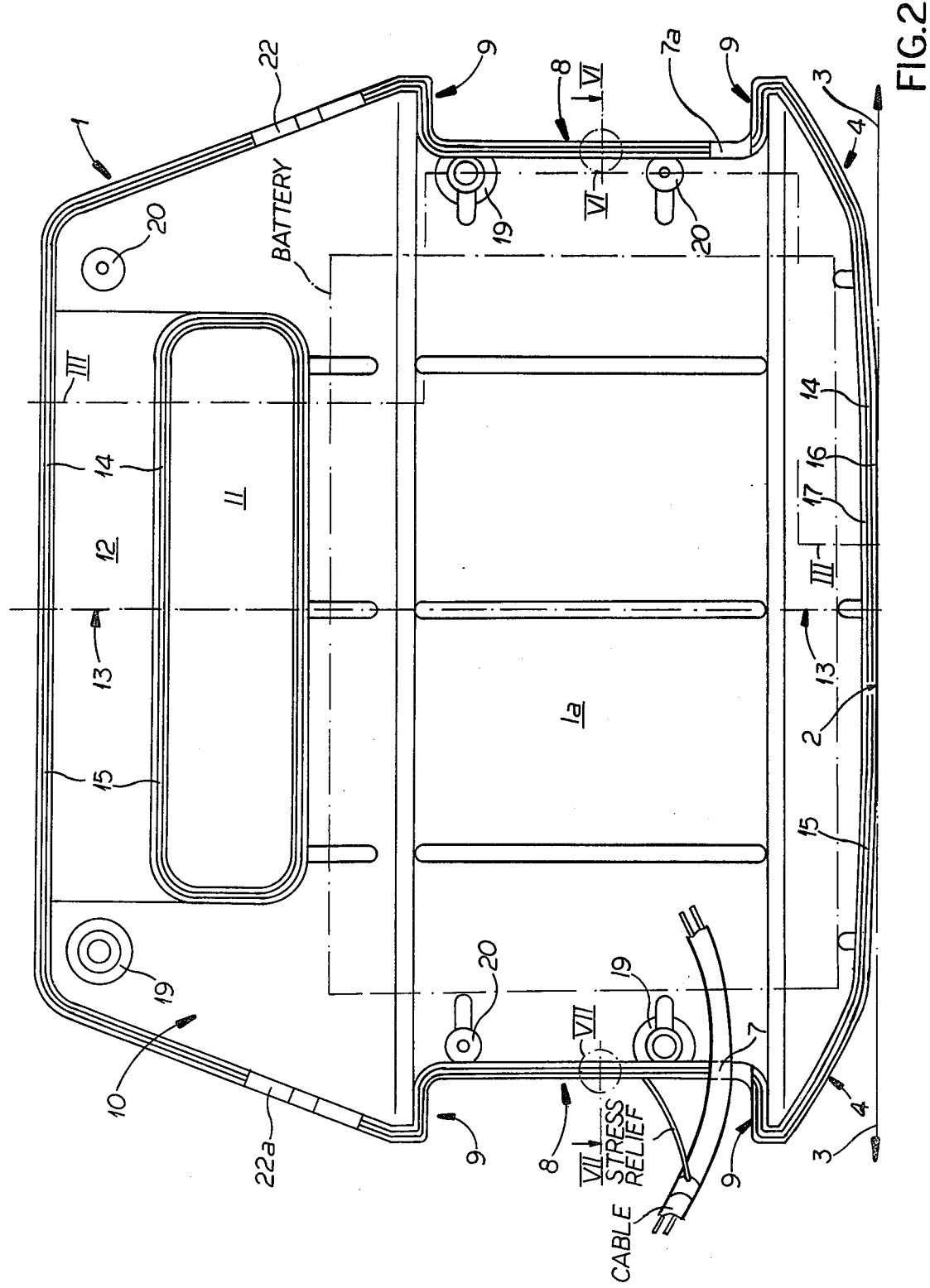
FIG. 2 is a view on the inside of one of the housing shells of the apparatus according to FIG. 1.
Figure 3:
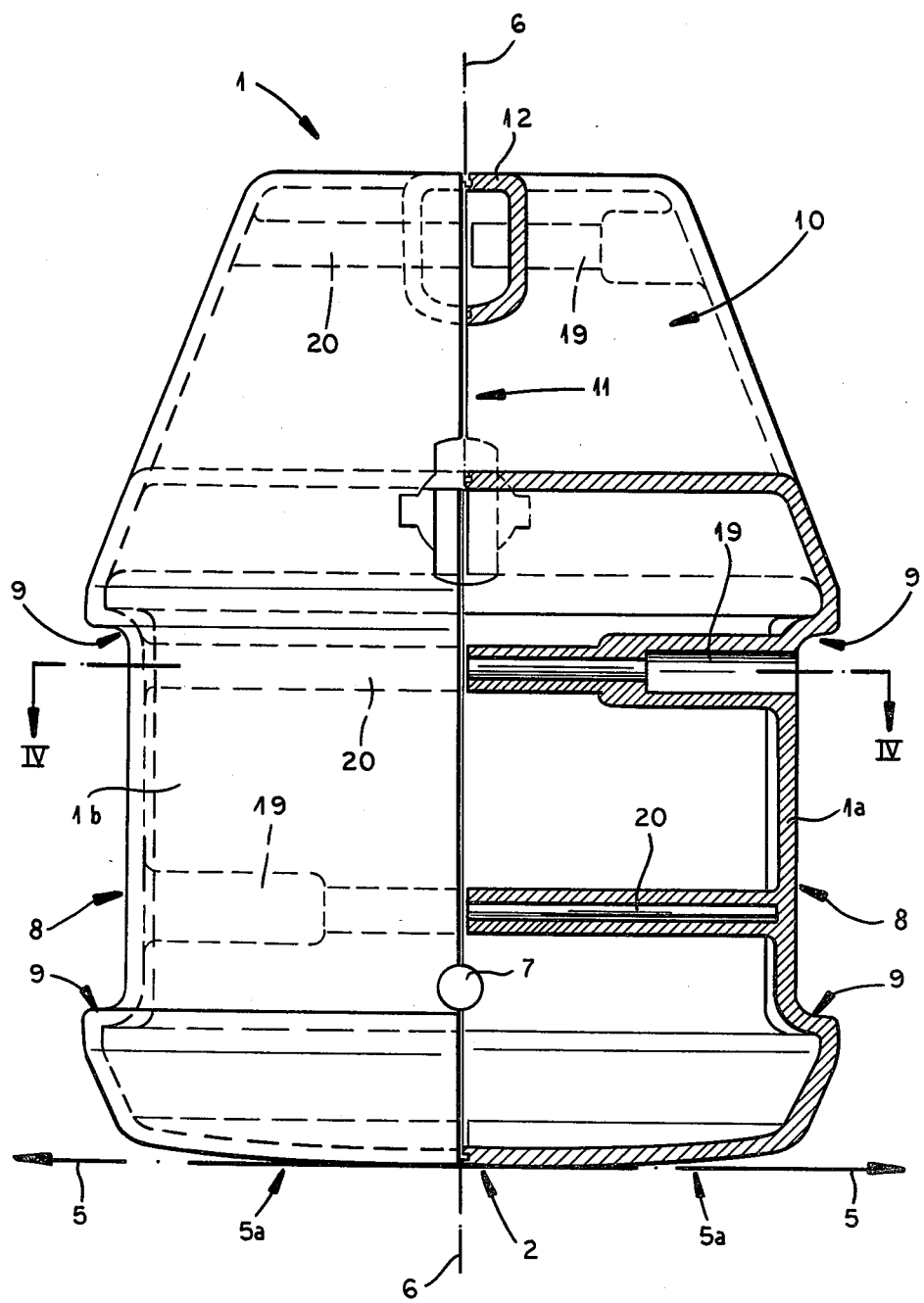
FIG. 3 is a sectional view in the direction III—III through FIG. 2 where the sectional view is supplemented in the left half of the figure by an elevational front view of the apparatus according to FIG. 1.
Figure 6:
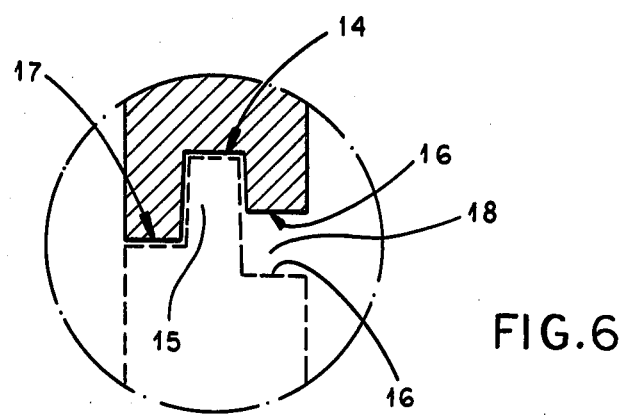
FIG. 6 is a detail sectional view indicated in FIG. 2 with VI in the direction of the arrow of the same number.
Figure 7:
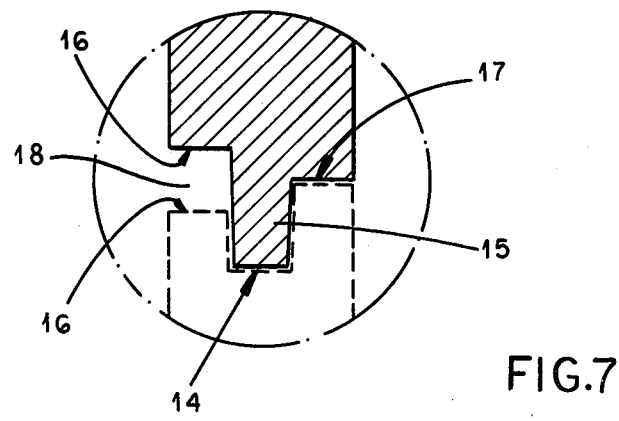
FIG. 7 is a detail sectional view indicated in FIG. 2 with VII in the direction of the arrow with the same number.

The housing comprises two identical corresponding housing shells 1a, 1b of which in the FIGS. 2 and 5 only the shell 1a is shown. The two housing shells 1a, 1b are joined in the vertical center plane 6—6 disposed parallel to the longitudinal direction 3—3 of the runners and form in each case half of the bottom face 2, the recess 8 and the gripper part 10. The two housing shells are symmetrical to the the vertical center plane 13—13 of the housing 1 running in the direction of the width direction of the bottom face 2. At their edges the shells 1a, 1b are fastened with a groove 14 and a tongue 15, where the shell edge provides on the right sides of the symmetry plane 13—13 shown in FIGS. 2 and 5 the groove 14 and on the other side the tongue 15. The groove and tongue shoulders, respectively, 16 disposed on the outside of the housing are recessed compared with the inside groove and tongue, respectively, shoulders 17 such as to form a broad root with chamber 18 upon fastening of the housing shells between themselves. In the fastened together state the two housing shells 1a, 1b are fastened together by screws not shown. For this purpose the screw receptacles are formed alternatively with respect to the symmetry plane 13—13 as passage hole 19 for receiving the barrel of the screw or bolt and of the screw or bolt head, respectively, and as a tapped hole 20 for receiving the screw or bolt taps where however the tap is only turned into the plastic by the self-cutting screws. In any case, this alternative arrangement to the symmetry plane 13—13 has the result that the together at their edges disposed shells 1a, 1b have a screw hole 19 in one shell disposed in each case oppositely to in the other shell a tapped hole 20. The groove and tongue formation 14, 15 of the shell edges provides for problem free mutual alignment of the two joined shells and connects these edges together at the same time by force-locking.

Because of the symmetry of the two housing shells 1a, 1b the cable exit hole 7 is repeated at the opposite housing position at 7a. This second opening can, as far as not needed otherwise, be closed by way of a cover part not shown here. The same is true for other housing openings 22, 22a provided for connecting purposes.

I claim:

1. An electrical supply apparatus for hand-tools or the like, comprising:

an upright housing having a downwardly convex bottom elongated in one direction to form a runner extending in said direction, said housing being formed with a handle at its upper end, said housing having an outwardly open annular recess above said runner, said bottom having a greater curvature in a vertical median plane in said direction than transversely to said plane, said housing being formed with an opening in said plane and in said recess at a level not substantially above the center of gravity of the apparatus;

a battery in said housing;

a cable running to said battery extending out of said housing through said opening for connecting the apparatus to a hand-tool or the like, said cable being adapted to be coiled in said recess; and cable-tension relief means connecting said cable to said housing.

2. The electrical supply apparatus defined in claim 1 wherein said recess is defined between a pair of shoulders formed in said housing and vertically spaced apart thereon, said opening being provided adjacent the lower shoulder.

3. The electrical supply apparatus defined in claim 1 or claim 2 wherein said housing is formed by two identical congruent housing shells joined along said vertical median plane and each defining half of the housing.

4. The electrical supply apparatus defined in claim 3 wherein each of said shells is symmetrical about another vertical median plane perpendicular to the first mentioned plane, said shells being provided with mating tongue and groove formations enabling their interconnection.

* * * * *